(12) United States Patent
Kim

(10) Patent No.: US 9,531,852 B2
(45) Date of Patent: Dec. 27, 2016

(54) WIRELESS COMMUNICATION TERMINAL

(71) Applicant: LG ELECTRONICS INC., Seoul (KR)

(72) Inventor: Junhong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/032,094

(22) PCT Filed: Sep. 3, 2014

(86) PCT No.: PCT/KR2014/008259
§ 371 (c)(1),
(2) Date: Apr. 26, 2016

(87) PCT Pub. No.: WO2015/076486
PCT Pub. Date: May 28, 2015

(65) Prior Publication Data
US 2016/0248893 A1    Aug. 25, 2016

(30) Foreign Application Priority Data

Nov. 25, 2013  (KR) .................. 10-2013-0143870

(51) Int. Cl.
*H04M 1/00* (2006.01)
*H04M 1/02* (2006.01)
(Continued)

(52) U.S. Cl.
CPC ........... *H04M 1/026* (2013.01); *H01Q 1/2266* (2013.01); *H04B 1/036* (2013.01)

(58) Field of Classification Search
CPC .... H04M 1/0202; H04M 1/026; H04M 1/035; H04R 1/1058; H01Q 1/243; H01Q 13/18
(Continued)

(56) References Cited

U.S. PATENT DOCUMENTS

2009/0154084 A1    6/2009  Goto et al.
2010/0073867 A1    3/2010  Tachikawa
(Continued)

FOREIGN PATENT DOCUMENTS

JP    2012-083860         4/2012
JP    5005842 B1 *        8/2012
(Continued)

OTHER PUBLICATIONS

PCT International Search Report dated Jan. 6, 2015 issued in Application No. PCT/KR2014/008259 (with English Translation).

*Primary Examiner* — Keith Ferguson
(74) *Attorney, Agent, or Firm* — KED & Associates, LLP

(57) ABSTRACT

To achieve the above objectives, a wireless communication terminal of the present invention comprises: a case having a bent hole formed in one side thereof; an antenna carrier disposed in the case such that a side thereof faces the bent hole, and including a duct passing through one side and the other side thereof; a fan disposed on the other side of the antenna carrier; and an antenna disposed on the antenna carrier and the top surface of the fan and having an antenna pattern for transmitting and receiving wireless signals, wherein the wireless communication terminal has the antenna and a heat dissipating structure disposed in proximity such that one member performs two or more functions, so as to provide a wireless communication terminal making good use of internal space.

9 Claims, 4 Drawing Sheets

(51) Int. Cl.
*H04B 1/036* (2006.01)
*H01Q 1/22* (2006.01)

(58) Field of Classification Search
USPC .............................. 455/575.7, 575.1, 550.1,
575.8,455/90.1–90.3, 575.2, 73; 343/702,
784; 379/430, 433.01, 428.01
See application file for complete search history.

(56) References Cited

U.S. PATENT DOCUMENTS

2012/0050121 A1   3/2012   Kim et al.
2013/0299125 A1   11/2013  Shi et al.

FOREIGN PATENT DOCUMENTS

KR   10-2009-0065422   6/2009
WO   WO 2012/026635   3/2012

\* cited by examiner

WIRELESS COMMUNICATION TERMINAL

CROSS-REFERENCE TO RELATED PATENT APPLICATIONS

This application is a U.S. National Stage Application under 35 U.S.C. §371 of PCT Application No. PCT/KR2014/008259, filed Sep. 3, 2014, which claims priority to Korean Patent Application No. 10-2013-0143870, filed Nov. 25, 2013, whose entire disclosures are hereby incorporated by reference.

FIELD OF THE INVENTION

The present invention relates to a wireless communication terminal having increased usage of internal space.

BACKGROUND ART

A terminal (or user equipment) may be divided into a mobile/portable terminal and a stationary terminal depending on its mobility. And, a mobile/portable terminal may then be divided into a handheld terminal and a vehicle mount terminal depending on its handheld portability.

As functions of such terminals have become more diverse, such terminals are being embodied in the form of a Multimedia player, which is equipped with complex functions, such as capturing (or recording) still pictures or videos, playing music or video files, playing games, receiving broadcast, and so on.

In order to exchange information with other devices, such terminal is equipped with a wireless communication unit. Wireless communication consists of diverse types, such as communication for exchanging information with satellites existing outside the atmosphere, for receiving broadcast information, for using wireless Internet, and so on, short range communication for exchanging information with a neighboring (or adjacent) device, and so on, and such terminal should be diversely equipped with different types of wireless communication antennas with respect to each communication method.

As the antenna types have become more diverse, difficulty occurs in ensuring space inside the terminal, and, since the antenna is influenced by other electronic devices, the position of the antenna is eventually limited in order to ensure its performance, and, therefore, research on the positioning of antennas inside a terminal is being carried out.

DETAILED DESCRIPTION OF THE INVENTION

Technical Objects

An object of the present invention is to provide a wireless communication terminal with increased usage of internal space by positioning the heat dissipation structure and the antenna, which are positioned in the wireless communication terminal, to be adjacent to one another, and by having one member perform two or more functions.

Technical Solutions

In order to achieve the above-described object, the present invention provides a wireless communication terminal including a case having a vent hole formed on one side; an antenna carrier being positioned to have one side face into the vent hole on an inner side of the case and including a duct passing through one side and another side thereof; a fan being positioned on another side of the antenna carrier; and an antenna having an antenna pattern positioned on upper surfaces of the antenna carrier and the fan and transmitting and receiving radio signals.

The wireless communication terminal further includes a heat sink being positioned between the antenna carrier and the fan and including a plurality of pins being extended from the antenna carrier and toward the fan; and a heat pipe having one end contacting the heat sink and another end contacting a heat-generating assembly part, and the antenna may simultaneously cover the upper surface of the antenna carrier and the upper surface of the heat pipe.

The antenna pattern may include a radiating part, a feeding part, and a grounding part, and the radiating part may be fixed to the upper surface of the antenna carrier.

A shape of the upper surface of the antenna carrier may correspond to a shape of the radiating part.

The heat pipe may be configured of a metallic material, and the grounding part of the antenna pattern may contact the heat pipe.

The wireless communication terminal may further include a printed circuit board having the fan fixed thereto, and the feeding part may be bent so as to be electrically connected to the printed circuit board.

A hollow space may be formed toward one end and another end within the heat pipe, and the hollow space may be filled with a refrigerant carrying out phase change from liquid to vapor within a driving temperature range of the wireless communication terminal.

The antenna may include an adhesive tape having an adherent deposited thereon.

The case may be configured of a first case having a keypad positioned thereon and a second case having a display positioned thereon, and the vent hole may be formed on one side surface of the first case.

Effects of the Invention

According to at least one of the exemplary embodiments of the present invention, by positioning the heat dissipation structure and the antenna, which are positioned in the wireless communication terminal, to be adjacent to one another, and by having one member perform two or more functions, a wireless communication terminal demonstrating excellent usage of the internal space may be provided.

The antenna carrier provides a fixing part, to which the antenna is fixed, on its upper surface, while performing the function of a duct, which acts as a path for the wind being outputted from the fan, and, at the same time, the antenna carrier prevents the wind being outputted from the fan from leaking out of the heat dissipation structure.

Additionally, the heat pipe not only performs the function of transporting the heat of the heat-generating assembly part to the heat sink but also performs the function of the grounding part of the antenna.

The effects of the present invention will not be limited only to the effects described above. Accordingly, effects that have not been mentioned above or additional effects of the present application may become apparent to those having ordinary skill in the art from the description presented below.

BEST MODE FOR CARRYING OUT THE PRESENT INVENTION

Figure 1:
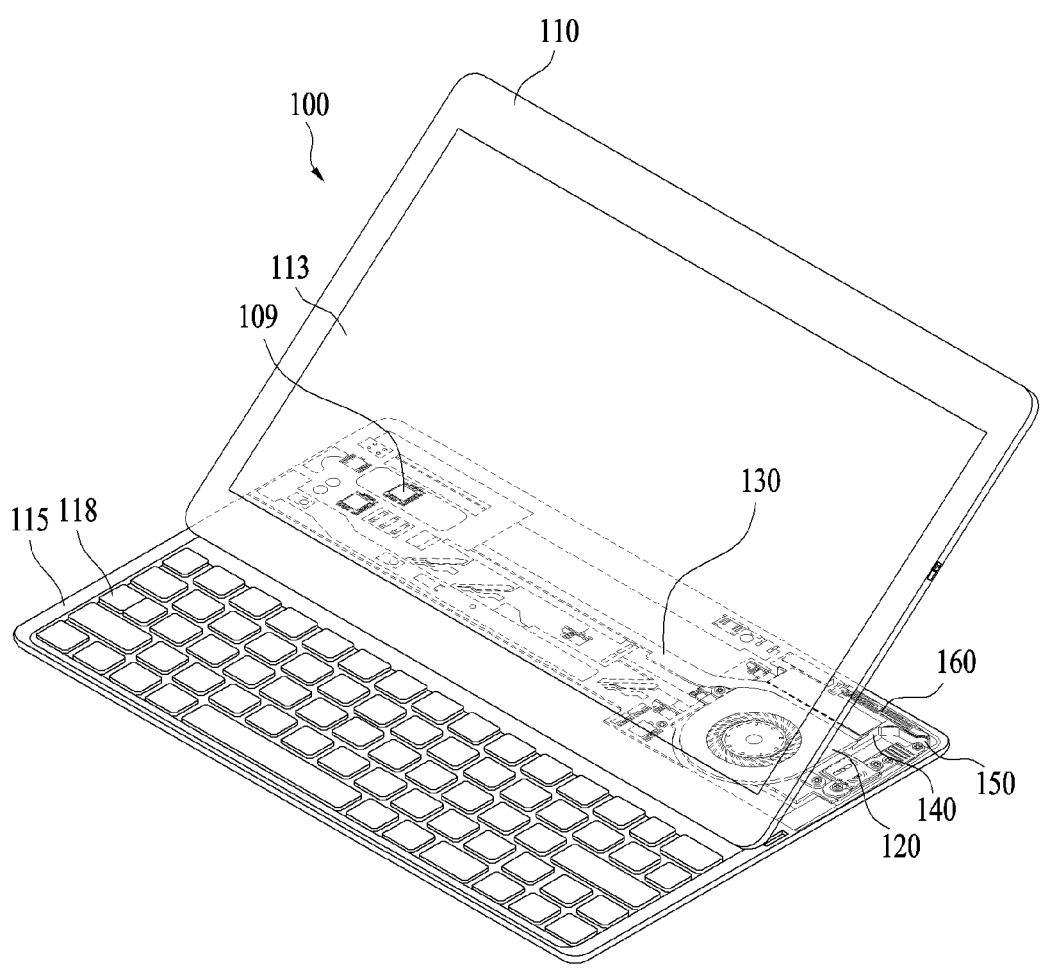
FIG. 1 illustrates a perspective view showing a wireless communication terminal according to an exemplary embodiment of the present invention.

The present invention may undergo diverse modifications and may have a plurality of exemplary embodiments, and specific exemplary embodiments will be given as examples in the accompanying drawings and will be described in detail in the detailed description of the present invention. However, it should be understood that the present invention will not be limited only to the specific exemplary embodiments presented herein, and it should also be understood that the scope and spirit of the present invention can be extended to all variations, equivalents, and replacements in addition to the appended drawings of the present invention.

Terms including numeric expressions, such as first (1st), second (2nd), and so on, used in the specification of the present invention may be used to describe diverse elements of the present invention. However, the elements of the present invention will not be limited by the terms used in the specification of the present invention. In other words, such terms will be used only to differentiate one element from other elements of the present invention.

When an element is described as "being connected to" or as "accessing" another element, although the corresponding element may be directly connected to or accessing the other element, it should be understood that yet another element may exist between the corresponding element and the other element. Alternatively, when an element is described as "being directly connected to" or as "directly accessing" another element, it should be understood that yet another (or a third) element does not exist between the two elements.

The terms used in this application are merely used to describe specific exemplary embodiments of the present invention and not intended to limit the present invention. And, unless obviously and clearly noted or specified otherwise within the specification, singular forms of the terms used herein may include plural forms of the corresponding terms.

In this application, the terms "include(s) (or comprise(s))" or "have/has" are used to designate the presence (or existence) of a characteristic, number, process step, operation, configuration element, assembly part, or a combination of the above, which are mentioned in this specification, and, therefore, it should be understood that the presence (or existence) or possible addition of one or more other characteristics, numbers, process steps, operations, configuration elements, assembly parts, or combinations of the above are not excluded in advance.

The suffixes "module" and "unit (or part)" that are mentioned in the elements used in the following description are merely used individually or in combination for the purpose of simplifying the description of the present invention. Therefore, the suffix itself will not be used to give a significance or function that differentiates the corresponding terms from one another.

Hereinafter, the wireless communication terminal (100) according to the exemplary embodiment of the present invention will be described in detail with reference to the accompanying drawings, and, regardless of the reference numerals, the same or corresponding configuration elements will be assigned with the same reference numeral and overlapping description of the same will be omitted for simplicity.

FIG. 1 illustrates a perspective view showing a wireless communication terminal (100) according to an exemplary embodiment of the present invention. The wireless communication terminal (100) according to this exemplary embodiment may be configured of a first case (110) being equipped with a keypad (118), and a second case (115) including a display unit (113). In case a physical keypad is omitted, and in case of applying a soft keypad for performing touch-type input through the display unit (113), the wireless communication terminal (100) may be equipped with only one case (110, 115).

Although the wireless communication terminal (100) may use one type of communication method, as the demand for terminals using diverse types of communication methods has recently increased, the wireless communication terminal (100) uses diverse forms of wireless communication methods.

When categorized in accordance with the wireless communication method, wireless communication may be divided into broadcast communication, mobile communication, wireless Internet, short range communication, position information wireless communication, and so on.

The broadcast communication method may receive a broadcast signal and/or information associated with broadcasting from an external broadcast management server through a broadcast channel, and the broadcast channel may include satellite channels and groundwave (or terrestrial) channels. In order to perform synchronous (or simultaneous) broadcast reception or broadcast channel switching respective to two broadcast channels, the wireless communication terminal may be equipped with two or more of the broadcast reception antennas.

The information associated with broadcasting refers to information associated with a broadcast channel, a broadcast program, or a broadcast service provider. The information associated with broadcasting may also be provided through a mobile communication network.

The information associated with broadcasting may exist in diverse formats. For example, the information may exist in formats of EPG (Electronic Program Guide) of DMB (Digital Multimedia Broadcasting) or ESG (Electronic Service Guide) of DVB-H (Digital Video Broadcast-Handheld), and so on.

The mobile communication method corresponds to a method of transmitting and receiving radio signals with at least one of a base station and an external terminal server within a mobile communication network, and examples of the mobile communication method may include GSM (globaltransparentem[global system] for Mobile communications), CDMA (Code Division Multiple Access), WCDMA (Wideband CDMA) (the method is not limited only to these), and so on.

The radio signal may include diverse formats of data in accordance with the transmission and reception of voice call signals, video phone call signals, or text/multimedia messages.

For the wireless Internet method, WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) (the method is not limited only to these), and so on, may be used.

Short range communication corresponds to a technology performing communication with a terminal or external wireless device located at a distance within approximately 10 m, and, herein, Bluetooth, RFID (Radio Frequency Identification), IrDA (infrared Data Association), UWB (Ultra Wideband), Zigbee, and so on, may be used for short range communication.

The position information wireless communication corresponds to a method of performing communication with a satellite in order to acquire the current position information of the wireless communication terminal (100), and a typical example of this method may correspond to a GPS (Global Positioning System). According to the current technology, the GPS may calculate (or compute) an accurate three-dimensional current position information in accordance with the latitude, longitude, and altitude by calculating information on distances between 3 or more satellites and accurate time information and then by applying trigonometry on the calculated (or computed) information.

Currently, a method of using three satellites for calculating the position and time information and using another satellite for correcting differences in the calculated position and time information is widely used. Additionally, by continuously calculating the current position in real-time, the GPS module (115) may calculate speed information.

As described above, in order to use the diverse wireless communication methods, each of the antennas shall be equipped, and since the antenna transmits and receives radio signals, and since this may influence neighboring antennas, the antennas are required to be spaced apart from one another to a predetermined distance.

Additionally, since interference may be caused with a signal of another electronic device, the position of the antennas shall be considered in accordance with other assembly parts. For such reasons, the antenna is generally positioned (or located) on an end portion or corner of the wireless communication terminal (100).

In this exemplary embodiment, when the antenna is positioned on a rear-side corner of the second case (115), by partially sharing an assembly part with the heat dissipation structure, which is positioned to be adjacent to the antenna, the utilization of space has been increased.

Since the electronic assembly parts inside the case (110, 115) generate heat when operated, the wind generated from the fan (120) absorbs the heat generated from the inside of the case (110, 115) and discharges it to the outside. The wind that has absorbed the heat is discharged to the outside through the vent hole (115), which is formed in the case (110, 115). The vent hole (115) may generally be positioned to the rear side of the first case (110) so as to prevent the wind from directly reaching the user.

At this point, since there lies a problem in that the heat dissipation structure may be positioned in the same location as the above-described antenna, an object of the present invention is to position the antenna and the heat dissipation structure with more spatial efficiency.

Figure 2:
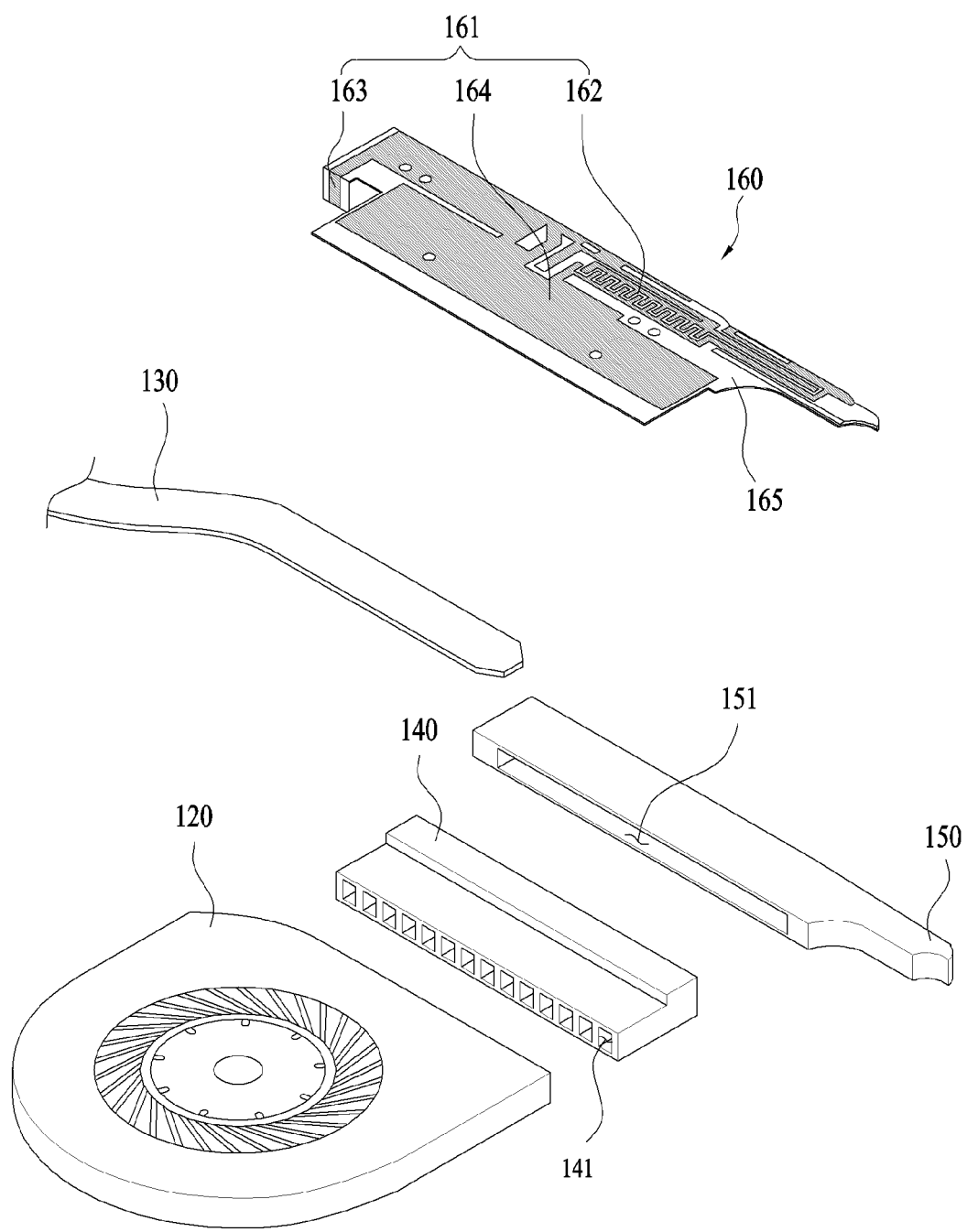
FIG. 2 illustrates an exploded perspective view showing an antenna, a fan (120), a heat pipe, a heat sink, and an antenna carrier of the wireless communication terminal according to the exemplary embodiment of the present invention.

FIG. 2 illustrates an exploded perspective view showing an antenna (160), a fan (120), a heat pipe (130), a heat sink (140), and an antenna carrier (150) of the wireless communication terminal (100) according to the exemplary embodiment of the present invention. The heat dissipation structure of the present invention may basically include a fan (120) and may then include a heat pipe (130) and a heat sink (140). The fan (120) generates wind with its turning force so that the heat within the case (110, 115) can be discharged to the outside through the vent hole (115). At this point, since the wind that is generated from the fan (120) cannot reach all of the parts within the case (110, 115), a heat pipe (130) may be used in order to absorb heat from an assembly part generating a large amount of heat when driven (or operated) (hereinafter referred to as a 'heat generating assembly part (190)') and to transport (or deliver) the absorbed heat toward the fan (120).

The heat pipe (130) is manufactured by using a metallic material having high thermal conductivity, and one end of the heat pipe (130) is positioned at an entrance (or opening) through which the wind from the fan (120) is discharged, and another end of the heat pipe (130) is contacted to the heat-generating assembly part (190). The heat absorbed from the heat-generating assembly part (190), which is contacting the other end, is transported toward the direction of the one end.

As shown in FIG. 2, the heat pipe (130) includes a hollow space in its inside, and the heat pipe (130) is extended significantly to one direction. The hollow space inside the heat pipe (130) is filled with a refrigerant, which causes a phase change from liquid to vapor within the driving temperature range of the wireless communication terminal (100).

More specifically, when the heat-generating assembly part (190) is operated (or driven), and when heat is generated accordingly, the refrigerant that is positioned at the other end portion of the heat pipe (130) is vaporized, and, after moving toward the direction of the one end of the heat pipe (130), the vaporized refrigerant carries out heat exchange due to the wind generated from the fan (120), and, then, the refrigerant undergoes a phase change to a liquid form.

In order to allow the heat transported through the heat pipe (130) to efficiently carry out heat exchange with the wind generated from the fan (120), a heat sink (140) increasing the contacting surface between the heat and the wind generated from the fan (120) is further included. The heat sink (140) contacts one end of the heat pipe (130) and includes a plurality of pins formed along the direction of the wind, which is generated from the fan (120). Heat exchange is carried out by the pins, and, accordingly, the temperature of the refrigerant in the heat pipe (130) is decreased.

Figure 3:
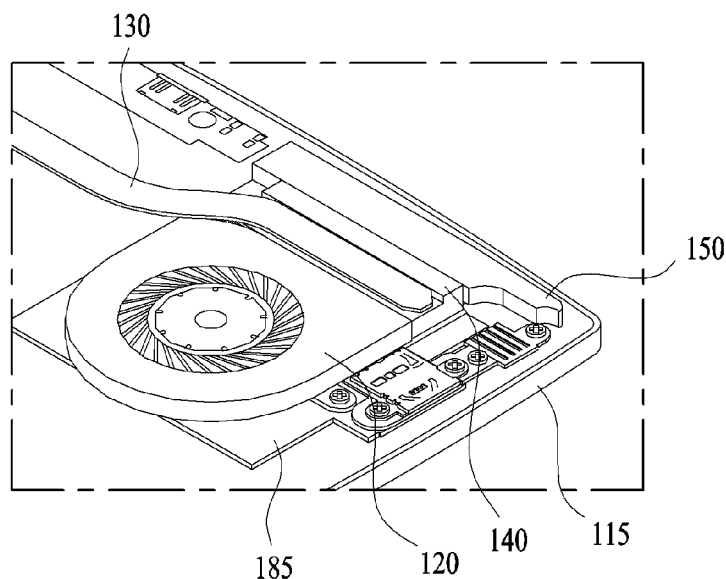
FIG. 3 illustrates a perspective view showing the fan, the heat pipe, the heat sink, and the antenna carrier before attaching the antenna of the wireless communication terminal according to the exemplary embodiment of the present invention.

FIG. 3 illustrates a perspective view showing the fan (120), the heat pipe (130), the heat sink (140), and the antenna carrier (150) before attaching the antenna (160) of the wireless communication terminal (100) according to the exemplary embodiment of the present invention. As shown in FIG. 3, the heat sink (140) is located at an exit through which the wind generated from the fan (120) flows out, and the heat pipe (130) is fixed to an upper surface of the heat sink (140).

In order to allow the antenna (160) to be fixed to its upper surface, the antenna carrier (150) has an upper surface having a shape that corresponds to the shape of the antenna (160), and, in order to prevent any influence to be caused on the performance of the antenna (160), the antenna carrier (150) is formed of a non-conductive substance, such as resin.

The antenna carrier (150) is positioned to be adjacent to the vent hole (115) and is located at a position where the wind from the heat sink (140) is discharged, and a lower portion of the antenna carrier (150) forms a space, which is used as a duct (151) connecting the heat sink (140) and the vent hole (115). More specifically, the upper portion of the antenna carrier (150) may be used as a fixing part to which the antenna is fixed, and the lower portion may be used as a duct (151) for allowing the heat to the discharged.

The antenna (160), which is located on the upper surface of the antenna carrier (150), may be realized by forming an antenna pattern (161) using a metallic substance on an upper surface of a film formed of resin, and the antenna pattern (161) includes a radiating part (162), a feeding part (163), and a grounding part (164). The radiating part (162) transmits and receives signals of a frequency respective to the standard of the corresponding antenna and is formed of a conductive material. The length of the radiating part (162) may be decided in accordance with the frequency of the signal that is being transmitted and received, and its mounting space may be reduced due to the antenna pattern (161) having a shape that is bent several times.

Both ends of the radiating part (162) are respectively connected to the feeding part (163) and the grounding part (164). The feeding part (163) is connected to a controller and is supplied with power from the controller, and, then, electric current flows along a loop, which connects the feeding part (163), the radiating part (162), and the grounding part (164). As the electric current flows along the loop, an electromagnetic field is formed, thereby allowing the signal to be transmitted and received.

Figure 4:
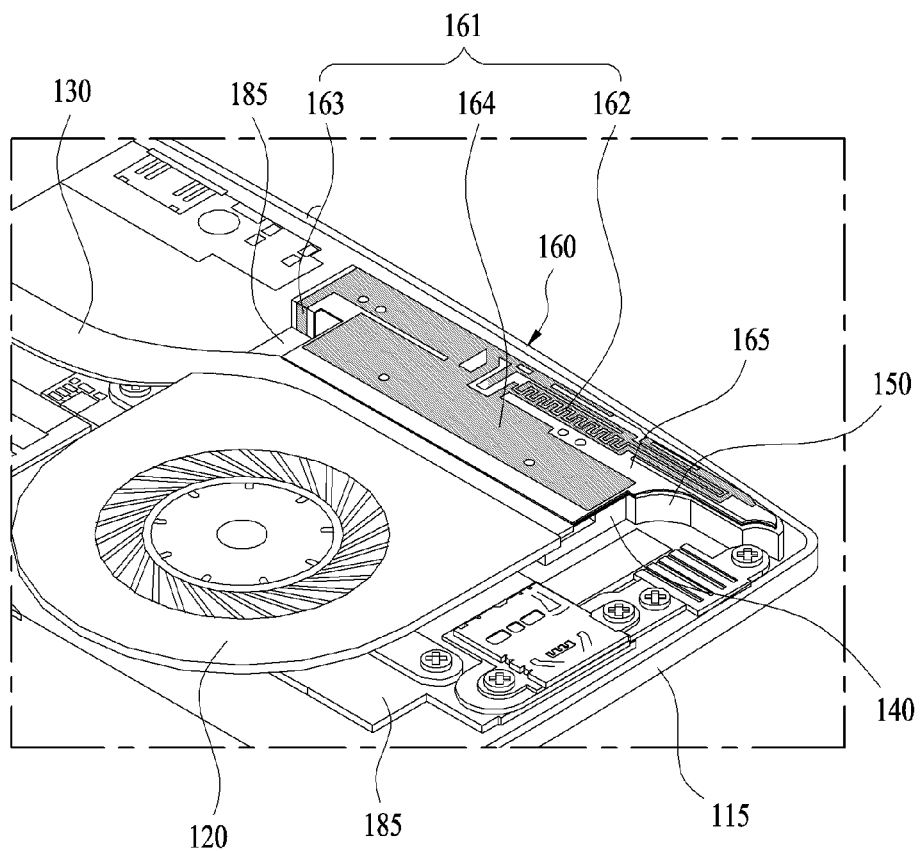
FIG. 4 illustrates a perspective view showing a state when the antenna is attached in FIG. 3.
Figure 5:
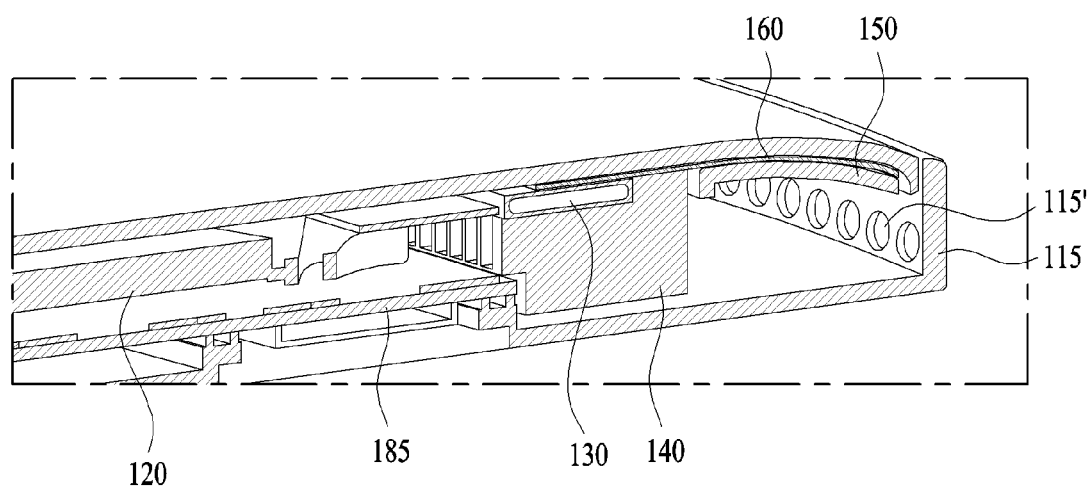
FIG. 5 illustrates a cross-sectional view of FIG. 4.

FIG. 4 illustrates a perspective view showing a state when the antenna (160) is attached in FIG. 3, and FIG. 5 illustrates a cross-sectional view of FIG. 4. A portion of the radiating part (162) of the antenna is located on the upper surface of the antenna carrier (150), the grounding part (164) is located on an upper surface of the heat pipe (130), and the feeding part (163) contacts a printed circuit board, which is bent and located on a bottom surface.

Since the radiating part (162) should not come in contact with a metallic object, the radiating part (162) is located on the upper surface of the antenna carrier (150), which is formed of a non-metallic substance. The shape of the antenna carrier (150) corresponds to the shape of the antenna pattern (161), and, since a portion of the radiating part (162) is fixed to the upper surface of the antenna carrier (150), the shape of the antenna carrier (150) is formed in a shape corresponding to the portion of the radiating part (162).

Meanwhile, the feeding unit (163) is connected to the printed circuit board in order to be supplied with power, and the grounding part (164) comes in contact with metal in order to be grounded. In order to establish the connection between the feeding part (163) and the printed circuit board, the antenna is partially bent (see FIG. 2), thereby allowing the feeding part (163) of the antenna pattern (161) to be combined with the printed circuit board. The grounding part (164) may be grounded by contacting a heat pipe (130), which is formed of a metallic substance, and the heat pipe (130) not only performs a function of transporting (or delivering) the heat of the heat-generating assembly part (190) but also performs a function of the grounding part (164).

The antenna (160) covers the upper portion of the antenna carrier (150) and a portion of the upper surface of the heat pipe (130). By using a tape (165) including an adherent on a lower surface of the film, the antenna (160) may be combined with the antenna carrier (150) and the upper surface of the heat pipe (13[130]).

At this point, the antenna (160) covers the heat pipe (130) and the upper surface between the heat sink (140) (or the heat pipe (130)) and the antenna carrier (150), thereby minimizing leakage of the wind through the antenna carrier (150) and the heat sink (140).

As described above, the antenna carrier (150) provides a fixing part, to which the antenna (160) is fixed, on its upper surface, while performing the function of a duct (151), which acts as a path for the wind being outputted from the fan (120), and, at the same time, the antenna carrier (150) prevents the wind being outputted from the fan (120) from leaking out of the heat dissipation structure.

Additionally, the heat pipe (130) not only performs the function of transporting the heat of the heat-generating assembly part (190) to the heat sink (140) but also performs the function of the grounding part (164) of the antenna. More specifically, the wireless communication terminal (100) according to the present invention positions the heat dissipation structure and the antenna so that they are adjacent to one another, and by having one member perform two or more functions, the utilization (or usage) of the internal space may be increased.

It will be apparent to anyone skilled in that art that the present invention may be realized in another concrete configuration (or formation) without deviating from the spiritual and essential characteristics of the present invention.

Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

What is claimed is:

1. A wireless communication terminal, comprising:
   a case having a vent hole formed on one side;
   an antenna carrier being positioned to have one side face into the vent hole on an inner side of the case and including a duct passing through one side and another side thereof;
   a fan being positioned on another side of the antenna carrier; and
   an antenna having an antenna pattern positioned on upper surfaces of the antenna carrier and the fan and transmitting and receiving radio signals.

2. The wireless communication terminal of claim 1, further comprising:
   a heat sink being positioned between the antenna carrier and the fan and including a plurality of pins being extended from the antenna carrier and toward the fan; and
   a heat pipe having one end contacting the heat sink and another end contacting a heat-generating assembly part, and
   wherein the antenna simultaneously covers the upper surface of the antenna carrier and the upper surface of the heat pipe.

3. The wireless communication terminal of claim 2, wherein the antenna pattern includes a radiating part, a feeding part, and a grounding part, and wherein the radiating part is fixed to the upper surface of the antenna carrier.

4. The wireless communication terminal of claim 3, wherein a shape of the upper surface of the antenna carrier corresponds to a shape of the radiating part.

5. The wireless communication terminal of claim 3, wherein the heat pipe is configured of a metallic material, and
   wherein the grounding part of the antenna pattern contacts the heat pipe.

6. The wireless communication terminal of claim 3, further comprising:
a printed circuit board having the fan fixed thereto, and wherein the feeding part is bent so as to be electrically connected to the printed circuit board.

7. The wireless communication terminal of claim 1, wherein a hollow space is formed toward one end and another end within the heat pipe, and wherein the hollow space is filled with a refrigerant carrying out phase change from liquid to vapor within a driving temperature range of the wireless communication terminal.

8. The wireless communication terminal of claim 1, wherein the antenna includes an adhesive tape having an adherent deposited thereon.

9. The wireless communication terminal of claim 1, wherein the case comprises a first case having a keypad positioned thereon and a second case having a display positioned thereon, and
wherein the vent hole is formed on one side surface of the first case.

* * * * *